(12) United States Patent
Oswal et al.

(10) Patent No.: US 12,003,348 B2
(45) Date of Patent: Jun. 4, 2024

(54) MICRO AND MACRO SEGMENTATION IN ENTERPRISE NETWORKS WITHOUT A PER SEGMENT LAYER-3 DOMAIN

(71) Applicant: Cisco Technology, Inc., San Jose, CA (US)

(72) Inventors: Anand Oswal, Pleasanton, CA (US); Muninder S. Sambi, Pleasanton, CA (US); Sanjay K. Hooda, Pleasanton, CA (US); Gangadharan Byju Pularikkal, San Jose, CA (US); Kedar Karmarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 17/649,955

(22) Filed: Feb. 4, 2022

(65) Prior Publication Data

US 2022/0158869 A1    May 19, 2022

Related U.S. Application Data

(63) Continuation of application No. 16/746,903, filed on Jan. 19, 2020, now Pat. No. 11,277,282.

(51) Int. Cl.
*H04L 12/46* (2006.01)
*H04L 12/18* (2006.01)
*H04L 61/5014* (2022.01)
*H04L 61/58* (2022.01)
*H04L 101/668* (2022.01)

(52) U.S. Cl.
CPC ...... *H04L 12/4679* (2013.01); *H04L 12/1886* (2013.01); *H04L 12/4633* (2013.01); *H04L 61/5014* (2022.05); *H04L 61/58* (2022.05); *H04L 2101/668* (2022.05); *H04L 2212/00* (2013.01)

(58) Field of Classification Search
CPC ............ H04L 12/1886; H04L 12/4633; H04L 12/4679; H04L 2212/00; H04L 12/1868; H04L 2101/622; H04L 2101/668; H04L 61/103; H04L 61/5014; H04L 61/5084; H04L 61/58
See application file for complete search history.

(56) References Cited

U.S. PATENT DOCUMENTS

| | | | | |
|---|---|---|---|---|
| 2010/0332626 | A1* | 12/2010 | Jonsson | H04L 61/59 709/238 |
| 2015/0096011 | A1* | 4/2015 | Watt | G06F 3/0647 726/15 |
| 2020/0344089 | A1* | 10/2020 | Motwani | H04L 45/66 |
| 2020/0389358 | A1* | 12/2020 | Kamath | H04L 41/0672 |

* cited by examiner

*Primary Examiner* — Zhensheng Zhang

(74) *Attorney, Agent, or Firm* — Patterson + Sheridan, LLP

(57) ABSTRACT

Secure network segmentation using logical subnet segments is described. A single network segment or subnet provided by a third party is mapped into multiple layer-3 virtual or logical segments without requiring separate subnets. This mapping is accomplished by using virtual routing functions (VRFs) per logical subnet segment while retaining a single subnet across the segments. The logical subnet segments interact with the single network segment provided by the third party (ISP). The layer-3 VRF instances are created without the need for separate IP subnet pools per layer-3 segment. Each VRF instance for the various logical subnet segments is mapped to an identifier and tag.

20 Claims, 13 Drawing Sheets

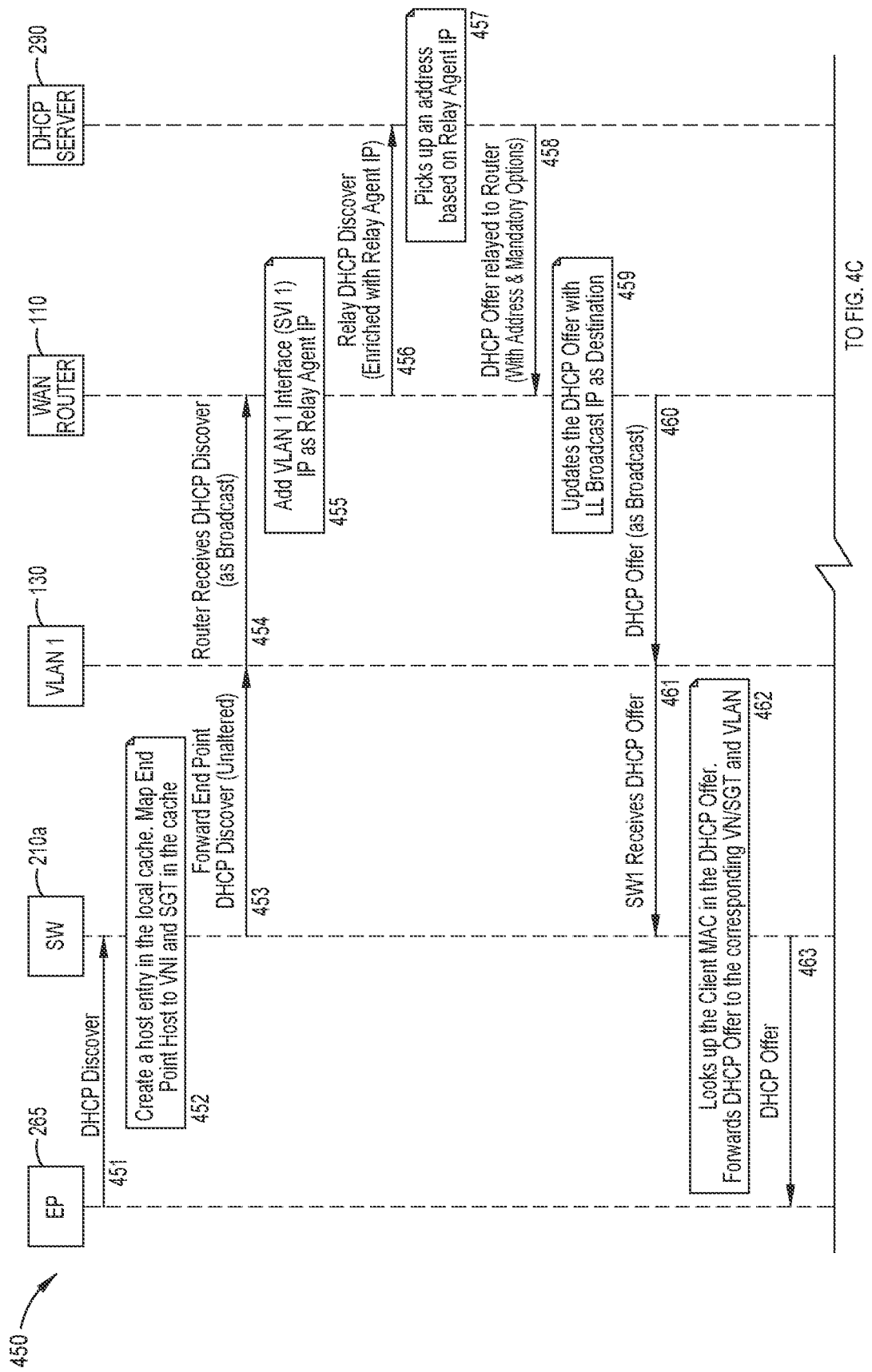

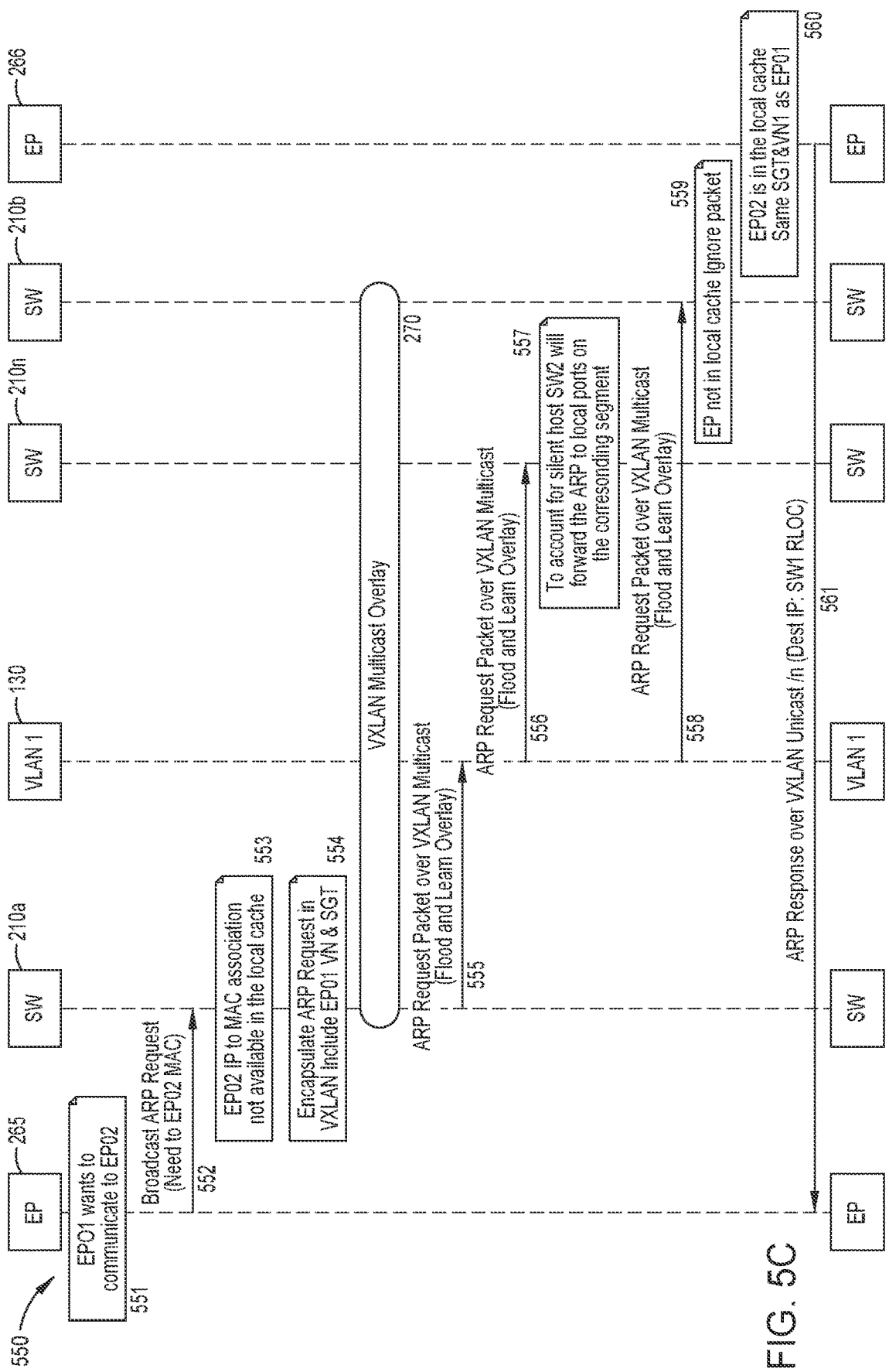

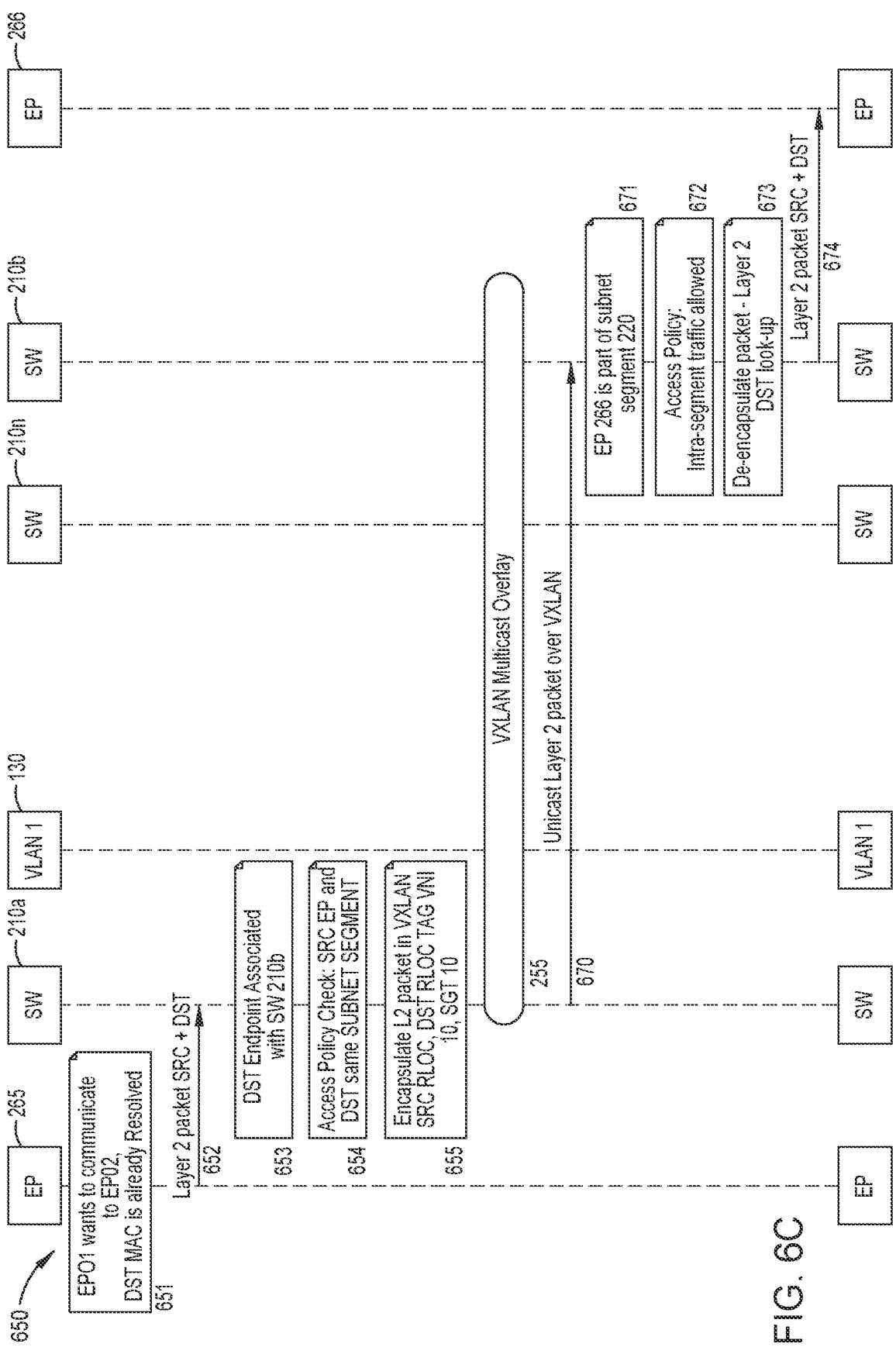

MICRO AND MACRO SEGMENTATION IN ENTERPRISE NETWORKS WITHOUT A PER SEGMENT LAYER-3 DOMAIN

CROSS-REFERENCE TO RELATED APPLICATIONS

This application is a continuation of co-pending U.S. patent application Ser. No. 16/746,903 filed Jan. 19, 2020. The aforementioned related patent application is herein incorporated by reference in its entirety.

TECHNICAL FIELD

Embodiments presented in this disclosure generally relate to network segmentation. More specifically, embodiments disclosed herein relate to methods and systems for providing secure micro and macro segmentation in networks without requiring a separate layer-3 domain, such as an internet protocol subnet, to be associated with each segment.

BACKGROUND

Network segmentation, such as Virtual Local Area Networks (VLANS), include one to one mapping of a network segment to a layer-3 (network layer) network. For example, traditional VLAN based segmentation as well as overlay-based architectures (e.g., Virtual Extensible local area networks (VXLANs)) both require one to one mapping between the virtual network and the physical network. This mapping of a separate layer-3 network per network segment poses challenges to implement network segmentation and security for many network deployments since the mapping requires increased overhead and resource usage.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4B-C are system flow diagrams for address acquisition in a segmented network, according to one embodiment.

FIGS. 5B-C are system flow diagrams for address resolution in a segmented network, according to embodiments.

FIGS. 6B-C are system flow diagrams for communication in a segmented network, according to embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
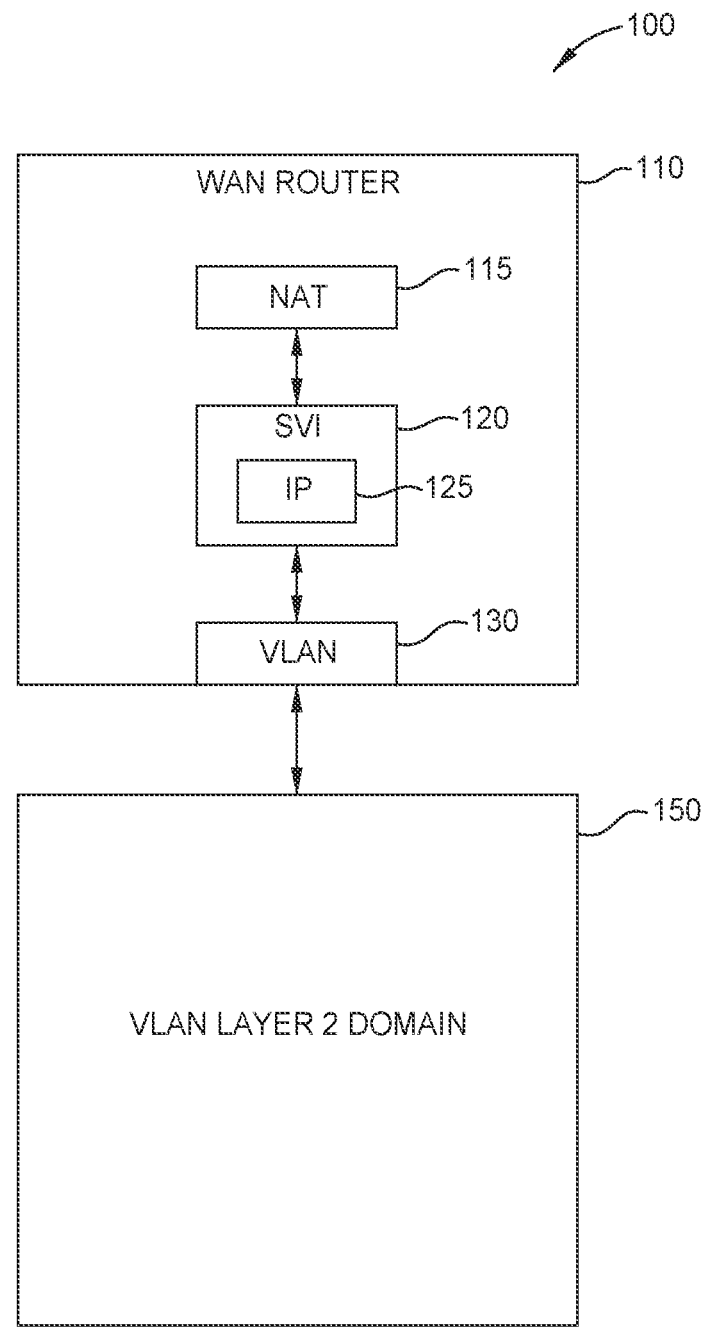
FIG. 1 illustrates a network, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method which includes initiating a default external interface including a default switched virtual interface (SVI) corresponding to a virtual local area network (VLAN), establishing a logical subnet segment interface from a main subnet segment, where the logical subnet segment interface includes a segment virtual routing and forwarding (VRF) instance for a logical subnet segment and an unassigned subnet segment SVI for the logical subnet segment, and assigning a segment virtual network identifier (VNI) to the logical subnet segment interface for the logical subnet segment. The method also includes mapping at least one scalable group tag (SGT) to the segment VNI. Other embodiments of this aspect include corresponding computer systems, apparatus, and computer programs recorded on one or more computer storage devices, each configured to perform the actions of the methods.

One example embodiment is a system. The system includes a processor; and a memory which may include instructions which, when executed on the processor, performs an operation. The operation may include initiating a default external interface including a default switched virtual interface (SVI) corresponding to a virtual local area network (VLAN), establishing a logical subnet segment interface from a main subnet segment, where the logical subnet segment interface includes a segment virtual routing and forwarding (VRF) instance for a logical subnet segment and an unassigned subnet segment SVI for the logical subnet segment, and assigning a segment virtual network identifier (VNI) to the logical subnet segment interface for the logical subnet segment. The operation also includes mapping at least one scalable group tag (SGT) to the segment VNI.

One example embodiment is a computer program product. The computer program product includes a computer-readable storage medium having computer-readable program code embodied therewith. The computer-readable program code executable by one or more computer processors to perform an operation. The operation may include initiating a default external interface including a default switched virtual interface (SVI) corresponding to a virtual local area network (VLAN), establishing a logical subnet segment interface from a main subnet segment, where the logical subnet segment interface includes a segment virtual routing and forwarding (VRF) instance for a logical subnet segment and an unassigned subnet segment SVI for the logical subnet segment, and assigning a segment virtual network identifier (VNI) to the logical subnet segment interface for the logical subnet segment. The operation also includes mapping at least one scalable group tag (SGT) to the segment VNI.

EXAMPLE EMBODIMENTS

One to one mapping of a network segment/subnet to a layer-3 network can limit the types of network deployments that utilize network segmentation. For example, mid-market enterprise network deployments typically have simple site network setups with a single wide area network (WAN) router, which is generally third party managed, with a single layer-3 network underneath or deployed from the WAN router. While this type of network deployment can utilize traditional network segmentation, these deployments face a myriad of challenges to enable multiple layer-3 domains. The challenges include increased costs such as an internet service provider (ISP) charging the network operator per layer-3 segment. Furthermore, the addition of traditional network segmentation increases management complexity of the local network sites such that smaller network deployments with traditional segmentation become cost prohibitive.

Example deployments that would benefit from network segmentation without the increased cost and complexity of traditional segmentation may include a network for a venue or complex where the venue/complex includes several tenants (e.g. malls with shopping tenants, small scale office buildings, workshare spaces, etc.). Another example includes an enterprise which would like to provide different network types to different people or services associated with the enterprise (e.g., employees, guests, internet-of-things, etc.) A network operator/provider for the mid-market deployments needs to provide network infrastructure support for the various tenants or network types. In traditional segmentation, the various network segments are mapped into separate virtual local area networks (VLANs). This creates network management and scalability problems for the network operator in addition to the increased costs described above.

The systems and methods described herein allow for a single network segment or subnet provided by a third party to be mapped into multiple layer-3 virtual or logical segments without requiring separate subnets. This mapping is accomplished by using virtual routing functions (VRFs) per logical subnet segment while retaining a single subnet across the segments. The logical subnet segments interact with the single network segment provided by the third party (ISP). The layer-3 VRF instances are created without the need for separate IP subnet pools per layer-3 segment. Each VRF instance for the various logical subnet segments is mapped to a Virtual Network Identifier (VNI) and Scalable Group Tag (SGT). Additionally, each logical subnet segment (virtual network) is mapped to a VRF instance, however there is no IP address assigned to the corresponding interface. This allows the maintenance of layer-2 and layer-3 address tables per VRF instance, and also eliminates problems that may arise concerning the use of duplicate IP space when communication between end points belonging to different macro-segments are required. The virtual network overlays provide policy based secure segmentation of different end points connected to the network to provide the logical segmentation without requiring one to one mapping between a logical segment and an IP subnet.

FIG. 1 illustrates a network 100, according to one embodiment. The network 100 includes a WAN router 110. In some examples, the WAN router 110 is provided to a network operator by a third party service, such as ISP, and serves as a default gateway for one or more sub-networks (e.g., one or more VLANs). The WAN router 110 may include network address translation function 115, a switch virtual interface (SVI), SVI 120, and a VLAN instance, VLAN 130. The SVI 120 includes an IP address 125 associated with the SVI 120 and the VLAN 130. As shown, the third party or ISP provides the single network segment, i.e., VLAN 130, to the network operator and the network operator maintains a VLAN layer-2 domain associated with the VLAN 130, i.e., domain 150, as described herein, such that multiple layer-3 VLANs for network segmentation are not required for network segmentation in the domain 150. The third party WAN provider such as an ISP does not have to alter the VLAN 130 provided to the provider (e.g., an Enterprise customer) of the network. The mapping of the domain 150 to the VLAN 130 allows for simpler network management compared to traditional segmentation and may not increase costs from the ISP. While shown with a single VLAN in FIG. 1, the WAN router and the network 100 may include multiple VLANs associated with other layer 2 domains, where network segmentation as described herein may be enabled on every VLAN or subnet in the network.

Figure 2:
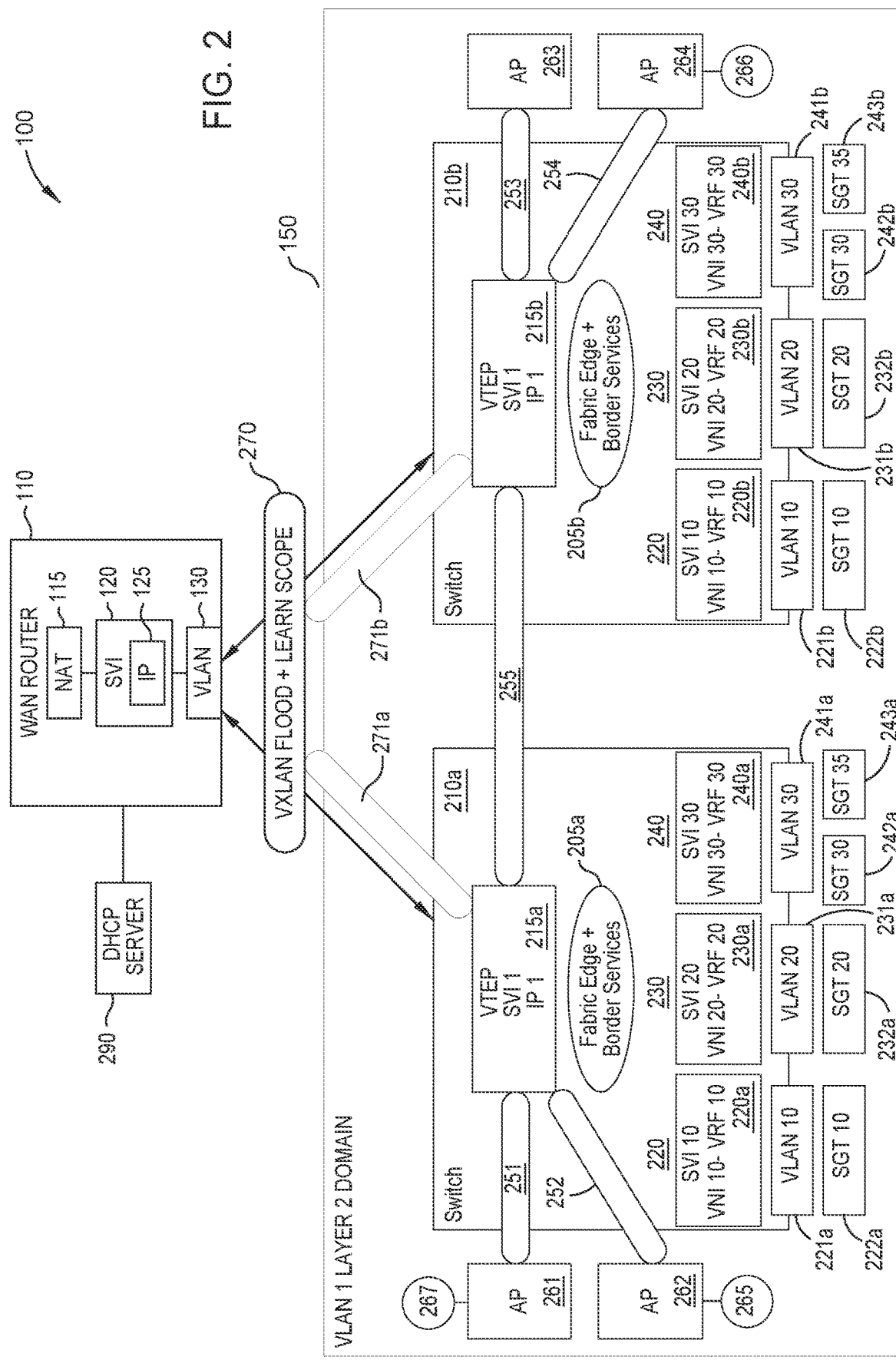
FIG. 2 illustrates a network with network segmentations, according to one embodiment.

FIG. 2 illustrates a network 100 with network segmentations, according to one embodiment. The VLAN layer-2 domain associated with the VLAN 130, domain 150, includes one or more switches, such as switch 210a and switch 210b which provide network segmentation without the need of a layer-3 mapping as described herein. While shown with two switches for simplicity, the network, e.g. domain 150, may include multiple additional switches (e.g., switch 210n). The switches 210a and 210b communicate with the WAN router 110 via the VLAN 130 and maintain a default interface on the switch for the VLAN 130 such as VXLAN tunnel endpoints (VTEPs) 215a and 215b. The VTEPs 215a and 215b serve as the routing locator (RLOC) for the switch, devices connected to the switch, and logical subnet segments installed on the switch. The VTEPs 215a and 215b also identify the SVI 120 and the IP address 125 for the VLAN 130.

The switch 210 also includes the fabric edge and border services 205a and 205b which functions as a control plane for the fabric and handles control plane traffic and data traffic for the respective switches and maintain the various tables and policies for various logical subnet segments, as described herein. The domain 150 includes logical subnet segments 220, 230, and 240. Each of the logical subnet segments includes various interfaces and policies for logical subnet segments installed on the switches in the network.

For example, the logical subnet segment 220 on the switch 210a includes a subnet interface 220a which includes an SVI for the subnet (e.g., SVI 10) and a VNI (e.g., VNI 10) and VRF instance (e.g., VRF 10) for the logical subnet segment 220. The SVI for the logical subnet segment 220, SVI 10, does not have an assigned IP address. The switch 210b includes a subnet interface 220b for the logical subnet segment 220 which also includes SVI 10, VNI 10, and VRF 10. The logical subnet segment 220 also includes a VLAN for the subnet and a scalable group tag (SGT) for the subnet such as VLAN 10 and SGT 10, where the VLAN 10 and the SGT 10 include a VLAN instance 221a and SGT instance 222a on the switch 210a and a VLAN instance 221b and SGT instance 222b on the switch 210b. The logical subnet segment 220 functions as a secure subnet and does not allow for communication to/from the logical subnet segment from other logical subnet segments (unless specific policies allow for cross segment communication). The logical subnet segment 220 also allows for communication from the various endpoints and devices connected to the logical subnet segment to common network services such as the Internet, Dynamic Host Configuration Protocol (DHCP) services, domain name system (DNS) services, etc. as described in relation to FIGS. 4A-B The logical subnet segment 230 and 240 also include subnet interfaces (230a, 230b, 240a, 240b) which include SVIs for the respective subnet segments (e.g., SVI 20 and SVI 30), where the SVIs include associated VNIs and VRF instances (VNI 20, VRF 20, VNI 30, and VRF 30). The logical subnet segments 230 and 240 also include associated VLANs (e.g., VLAN 20 and VLAN 30) including instances of the VLANs on the various switches (e.g., VLAN instances 231a, 231b, 241a, and 241b). The logical subnet segment 230 and 240 also include associated SGTs. The SGT 20 for the logical subnet segment 230 includes the SVI instances 232a and 232b. The SGTs 30 and 35 provide further segmentation in the network (e.g., micro-segmentation) via the SGTs. The SGTS 30 and 35 are represented by the SGT instances 242a, 243a, 242b, and 243b. The logical subnet segments 230 and 340 also function as a secure subnet segments and do not allow for communication to/from the logical subnet segment from other logical subnet segments including micro-segments provided by the SGTs (unless specific policies allow for cross segment communication).

Figure 4A:
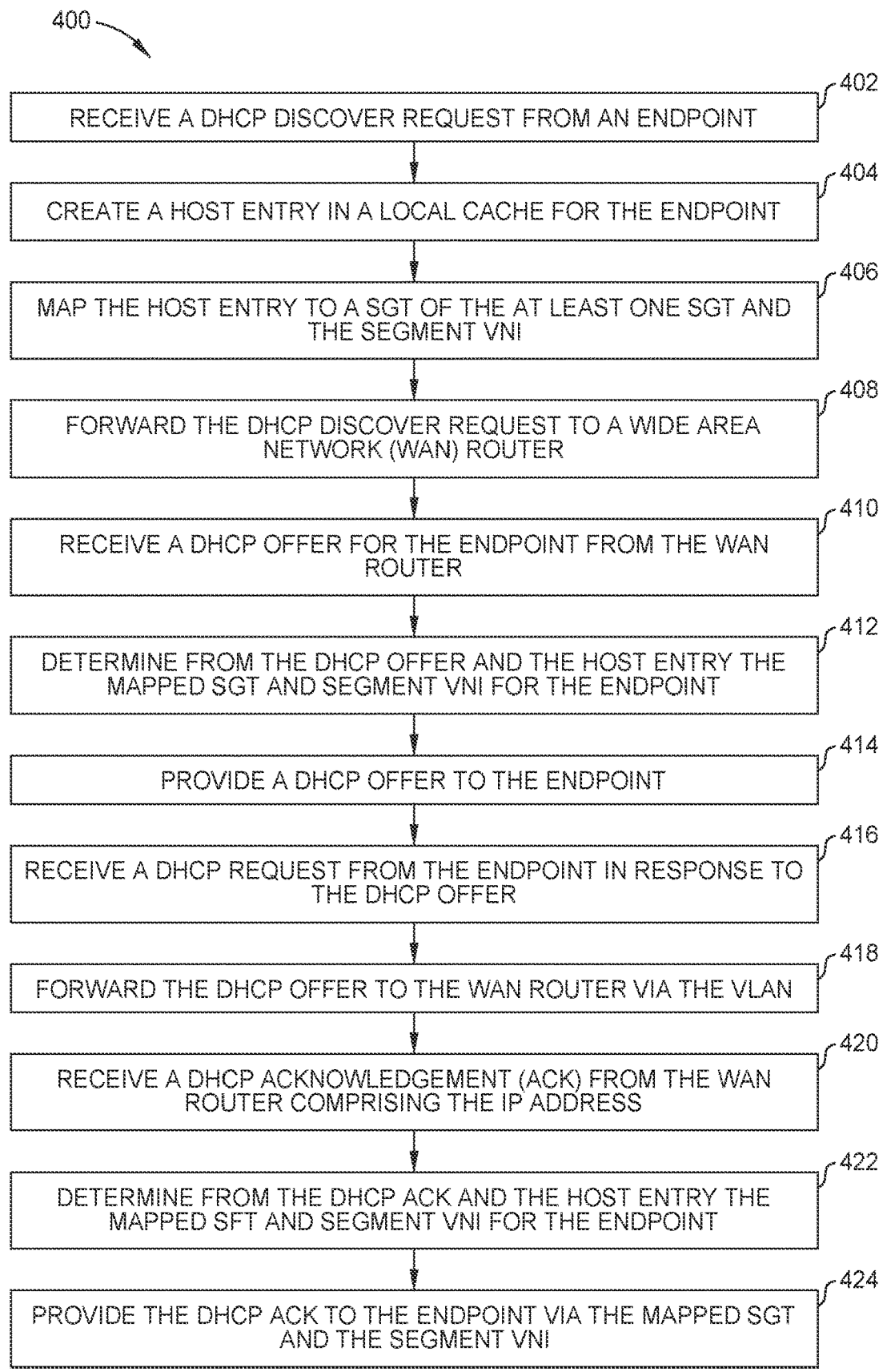
FIG. 4A is a method for address acquisition in a segmented network, according to one embodiment.

Furthermore, the logical subnet segments 220-240 also allow for communication from the various endpoints and devices connected to the logical subnet segment to common network services such as the Internet, DHCP services, DNS services, etc. as described at least in relation to FIGS. 4A-B.

The switches 210a and 210b support connections to APs in the domain 150 including APs 261, 262, 263, and 264, which in turn provide network connection to endpoints, such as endpoints 265-267. The connections to the APs from the switches include tunnels 251, 252, 253 and 254 between APs and the switches and tunnel 255 between the switches 210a-b, where the tunnels transport network traffic including control traffic and data traffic. In some examples, the tunnels 251-255 are VXLAN unicast tunnels between the various components. The tunnel 255 operates over the VLAN 130. The switches 210a and 210b also communicate with each other via the VLAN 130 which includes a VXLAN flood and learn scope overlay 270 and tunnels 271a and 271b (e.g., VXLAN multicast tunnels).

As described herein, the network segmentation of the domain 150, including the logical subnet segments 220-240, provides security and segmentation by supporting segmentation of connected endpoints corresponding to various segmentation goals (e.g., segmentation for different lines of business, departments, tenants, access rights, etc.) while also providing with security and traffic separation in the logical subnet segments. In some examples, users within a segment may also be further subdivide into micro-segments using SGTs (e.g., the SGTs 30 and 35) with group-based policies among these micro-segments.

In the layer-2 domain 150, the connected endpoints are tracked using the MAC-address of the connected device (not the IP address of the endpoint). A fabric control plane, such as fabric edge and border services 205a and 205b, maintains a local cache for address associations such as a local instance of Locator ID Separation Protocol (LISP) mapping database table. The local caches includes both layer-2 and layer-3 information such as an address association or mapping between endpoint identification (EID) (e.g., MAC and IP), VNIs and SGTs for all the endpoints connected locally (e.g., connected to the switch), and cached entries for the address association (EID to RLOC mapping) learned from the other switches in the fabric domain (e.g., address associations for endpoints connected to other switches in the domain 150).

The fabric control plane (e.g. fabric edge and border services 205a and 205b) also resolves the address association to RLOC mapping information for the endpoints (hosts) not locally connected on the switch by flooding the ARP request packet for the unknown address (e.g., destination MAC address) over a Multicast VXLAN overlay, e.g., the VXLAN flood and learn scope overlay 270) as described in relation to FIGS. 4A-4B. In some examples, ARP requests for unknown destination MACs will also be flooded locally within a logical subnet segment on a switch to discover any silent host/endpoint residing on the local switch. The local cache maps each endpoint MAC addresses to the locations (as represented by a RLOC of the Edge Nodes/switches). A distributed control plane such as the VXLAN flood and learn scope overlay 270 is used to build the address association information in the local cache information using MAC-addresses and a RLOC mapping database.

The logical subnet segments shown in FIG. 2 can be used for a variety of implementations in the network. For example, each tenant in a multi-tenant deployment is of the network is assigned to a specific logical subnet segment in the domain 150. Traffic and communication for each tenant's logical subnet segment is isolated and/or secure from the other logical subnet segments while providing access to common network functions such as the Internet, DHCP services, etc.

In another example, a single enterprise can establish various types of logical subnet segments for a variety of uses with different network access policies. For example, an employee logical subnet segment is provided to employees of the enterprise to connect various devices and provides access to the network including the Internet and other logical subnet segments (e.g., an endpoint in the employee logical subnet segment can communicate to other endpoints in other logical subnet segments). Other types of logical subnet segments can include a services segment which can only accept inbound connections from employee logical subnet segment, and IOT logical subnet segment which functions as an isolated segment with only Internet Access allowed and communication from employee logical subnet segment, and a guest segment with only Internet access and inbound sessions from the employee logical subnet segment among other options for network segments and policies. Traffic and communication for each of logical subnet segments is isolated and/or secure from the other logical subnet segments unless otherwise allowed by policies (e.g., employee logical subnet segment may access and/or communicate with any of the other subnet segments).

Furthermore, segmentation services can be also be extended across multiple branches (e.g., other sites) of the network over a private WAN network, enabling deployment of unified segmentation and group-based policies across branches/switches of the network as shown in FIG. 2. For example, the switch 210a and 210b may be at different geographic locations, where the connection and the logical subnet segments are facilitated over either a private WAN and/or a public network such as the Internet using various layer-3 overlays.

In some examples, the domain 150 functions as a site underlay network forming part of a layer-2 domain, where the VLAN 130 is designated as the layer-2 domain for the underlay/domain 150. In some examples, the network operator statically maps end point devices (endpoints 265-267) to various logical subnet segments by either mapping switch ports to a logical subnet segment or via VLAN to segment mapping. Static port level assignment can be done for switches for both VNI and SGT assignment. In one example, wireless SSIDs are assigned to a VNI and SGT, where each endpoint connected via the SSID is assigned to the logical subnet segment.

Figure 3:
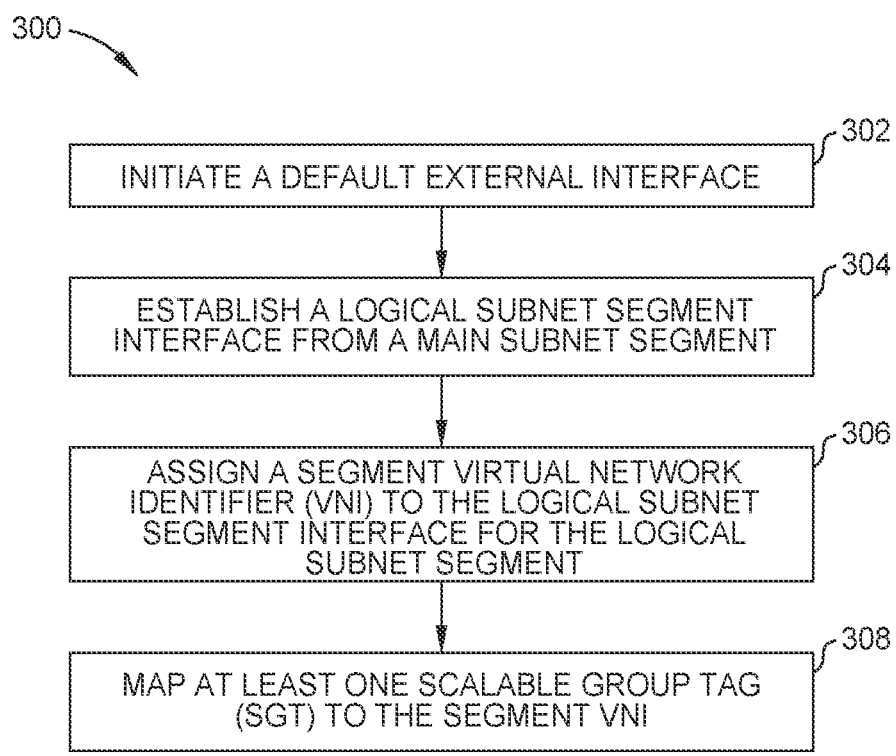
FIG. 3 is a method for establishing a segmented network, according to one embodiment.

FIG. 3 is a method 300 for establishing a segmented network, according to one embodiment. For example, the method 300 may be carried out at a switch in the domain 150 such as the switch 210a or 210b illustrated in FIG. 2 to establish the logical subnet segments in the network 100. For ease of discussion, method 300 will be discussed in relation to switch 210a. The steps of the method 300 may be performed by the fabric edge and border services 205a and/or the modules discussed herein in relation to FIG. 7. The method 300 may also be facilitated via an external network controller used to enable the network segmentation of the domain 150.

At block 302, the switch 210a initiates a default external interface for the switch, the external interface including a default SVI corresponding to a VLAN. For example, the switch 210a establishes the VTEP 215a upon receiving information related to the VLAN 130 and includes the SVI 120 and the IP address 125 for the VLAN 130 as the default interface for the switch 210a. The VTEP 215a serves as a default interface for communicating with the WAN router 110 and as the RLOC for the various endpoints connected to the switch 210a. The VTEP allows for the various logical subnet segments discussed herein to communicate with the networks and services provided by the WAN router 110 (e.g., the Internet, DHCP services, etc.).

At block 304, the switch 110a establishes a logical subnet segment interface for a logical subnet segment from a main subnet segment. For example, the switch 110a provisions the interface 220a where the interface 220a includes a VRF instance for a logical subnet segment (VRF 10) and an unassigned logical subnet segment SVI for the logical subnet segment (SVI 10), where the unassigned SVI 10 does not include an assigned IP address. At block 306, the switch 110a assigns a segment VNI to the logical subnet segment interface for the logical subnet segment. For example, the switch 110a assigns VNI 10 to the interface 220a for the logical subnet segment 220.

At block 308, the switch 110a maps at least one scalable group tag (SGT) to the segment VNI. For example, the switch 110a maps the SGT instance 222a to the logical subnet segment 220 and the interface 220a. In some examples, this process includes mapping the SVI 10 to the VLAN 10 (VLAN instance 221a). A single SGT mapped to a logical subnet segment (represented by the VNI) provides macro-segmentation in the domain 150. In another example, the switch 110a maps a plurality of SGTs to a single logical subnet segment (represented by the VNI) to provide micro-segmentation. For example, the switch 110a assigns the SGT instances 242a and 243a (SVI 30 and 35) to the subnet interface 240a to provide micro-segmentation to the logical subnet segment 240. In some examples, the switch 210a further establishes and/or populates the various tables, caches, and other storage functions for the logical subnet segments supported by the switch 210a in order to begin building the local cache of address associations described herein. The established logical subnet segments, such as the logical subnet segment 220, provide secure segmentation of the network by isolating traffic and communication in the subnet segments (as described in relation to FIGS. 5A-6C) while also providing unaltered access to traditional network services, such as described in relation to FIGS. 4A-B.

Figure 4C:
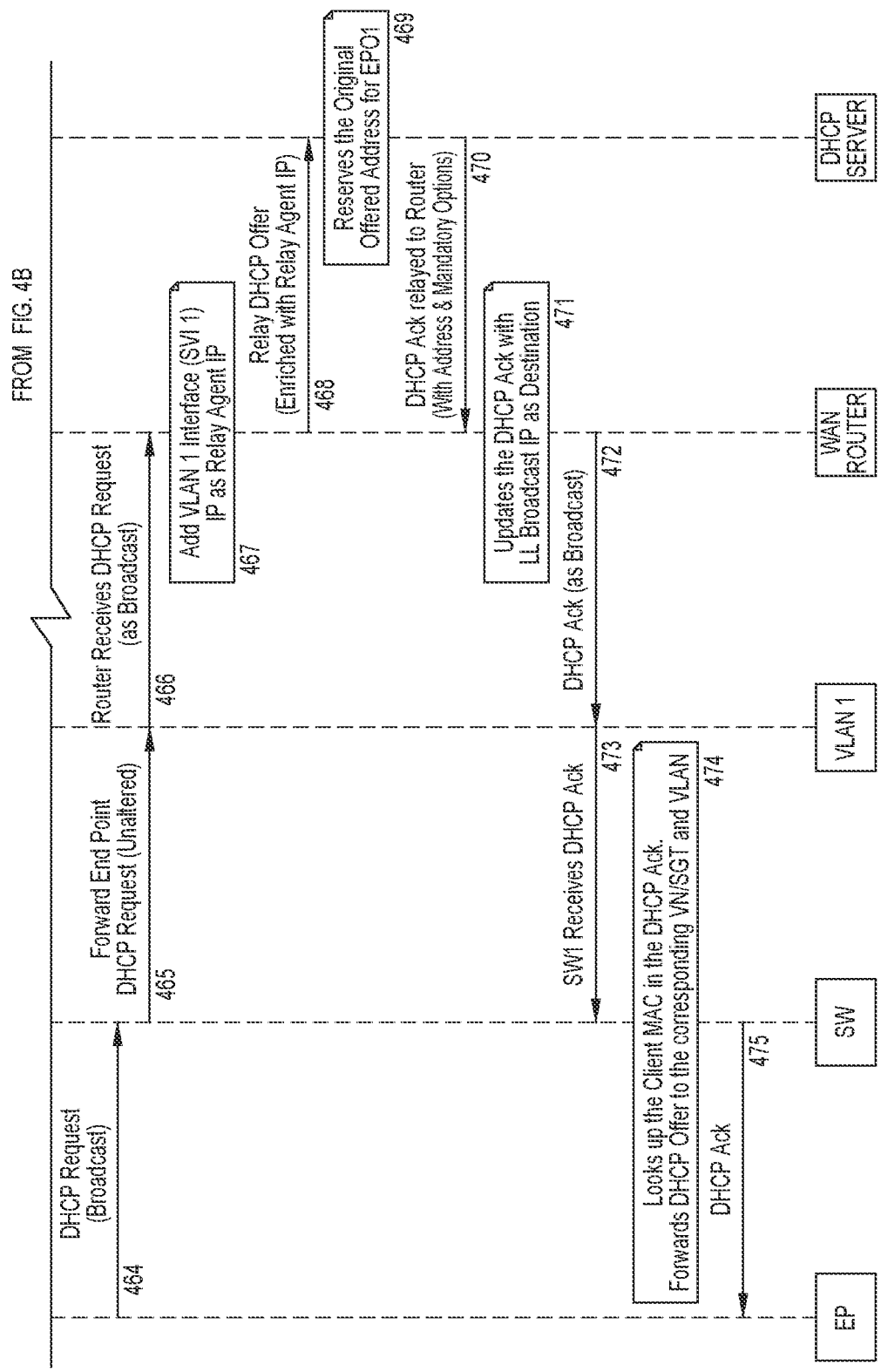

FIG. 4A is a method 400 for address acquisition in a segmented network, according to one embodiment. FIGS. 4B-C are a system flow diagram for address acquisition in a segmented network such as the network described in relation to FIG. 3, according to one embodiment. For ease of discussion, reference will be made to both FIG. 4A and FIG. 4B-C. Method 400 begins at block 402 where a switch, such as the switch 210a, receives a DHCP discover request from an endpoint. For example, in method 450 as shown in FIG. 4B, the switch 210a, at step 451, receives a DHCP discover request from the endpoint 265. In some examples, the endpoint 265 (or other endpoint in the network 100) sends the DHCP discover request upon connecting to the network or switch 210a (e.g., connecting to the AP 262 shown in FIG. 2). The switch 210a receives the DHCP discover request via a network connection to the AP 262.

At block 404, the switch 210a creates a host entry in a local cache for the endpoint and at block 406, the switch 210a maps the host entry to a SGT of the at least one SGT and the segment VNI. For example, at step 452, the switch 210a adds to a local cache for the logical subnet segment 220 and maps the endpoint 265 to the logical subnet segment 220 by mapping endpoint 265 to the subnet interface 220a including mapping the endpoint to the SGT instance 222a (SGT 10) and the VNI 10-VRF 10 of the subnet interface 220a.

At block 408, the switch 210a forwards the DHCP discover request to a WAN router via the VLAN. For example, at step 453, the switch 210a forwards/broadcasts the endpoint DHCP discover request in an unaltered state via the VTEP 215a and the VLAN 130. At step 454, the WAN router 110 receives the DHCP discover request and at step 455 adds the SVI 120 IP address (e.g., IP address 125) as the relay agent IP for the DHCP discover request. At step 456, the WAN router 110 forwards the DHCP discover request to the DHCP server 290, which uses the relay agent IP to determine/pick an IP address for the endpoint at step 457. In some examples, the DHCP server 290 generates a DHCP offer and adds additional options and/or mandatory options for connecting to the network to the DHCP offer prior to forwarding the DHCP offer to the WAN router 110 at step 458. For example, the DHCP server 290 may include DHCP option 82 or the DHCP relay agent information option to as a mandatory option for joining the network. In some examples, at step 459 the WAN router 110 updates the DHCP offer received from the DHCP server 290 with the IP 125 as the broadcast IP for the destination (endpoint 265) and forwards/broadcasts the DHCP offer to the switch 210a via the VLAN 130 at step 460.

Method 400 continues at block 410 where the switch 110a receives the DHCP offer for the endpoint from the WAN router via the VLAN. For example, at step 461, the switch 210a receives the DHCP offer WAN router 110 (via the VLAN 130). At block 412 the switch 110a determines from the DHCP offer and the host entry the mapped SGT and segment VNI for the endpoint and provides the DHCP offer to the endpoint at block 414. For example, at step 462 the switch 210a looks up a client MAC in the DHCP offer and forwards the DHCP offer to the endpoint via the logical subnet segment 220 based on the determined VNI/SGT information from the host entry in the local cache and the determined MAC. For example, the host entry indicates that the endpoint (according to the determined MAC address) is associated with the logical subnet segment 220 and the switch 210a forwards the offer to the endpoint 265 at step 463.

At block 416, the switch 210a receives a DHCP request from the endpoint in response to the DHCP offer. For example, at step 464 of FIG. 4C, the switch 210a receives a DHCP request broadcasted from the endpoint 265. At block 418, the switch 210a forwards the DHCP offer to the WAN router via the VLAN. For example, at step 465 the switch 210 forwards the DHCP request from the endpoint 265 to the WAN router 110 via the VLAN 130. In some examples, the DHCP request is forwarded without any alteration to the request from the switch 210a. At step 466, the WAN router 110 receives the DHCP request and at step 467 adds the SVI 120 IP address (e.g., IP address 125) as the relay agent IP for the DHCP request. At step 468 the WAN router 110 forwards the DHCP request with the update relay agent IP to the DHCP server 290.

At step 469, the DHCP server 290 reserves the original offered address for the endpoint 265 and generates a DHCP acknowledgment (ACK) message and sends the DHCP ACK message to the WAN router 110 at step 470. At step 471, the WAN router 110 updates the DHCP ACK message with the with the IP 125 as the broadcast IP for the destination (endpoint 265) and forwards/broadcasts the DHCP ACK message to the switch 210a via the VLAN 130 at step 472.

Method 400 continues at block 420 where the switch 210a receives the DHCP ACK message from the WAN router 110. In some examples, the DHCP ACK includes the IP address 125 as modified by the WAN router 110. For example, at step 473, the switch 210a receives the DHCP ACK message from the WAN router 110 via the VLAN 130. At block 422, the switch 210a determines from the DHCP ACK message and the host entry the mapped SFT and segment VNI for the endpoint and provides the DHCP ACK to the endpoint via the mapped SGT and the segment VNI at block 424. For example, at step 474, the switch 210a looks up the endpoint MAC In the DHCP ACK message and looks up the associate logical subnet segment (e.g., logical subnet segment 220) and the associated interface (220a) for the endpoint 265 and forwards the DHCP ACK message to the endpoint 265 at block 475. In some examples, this connects the endpoint 265 to the network 100 and the assigned logical subnet segment.

Figure 5A:
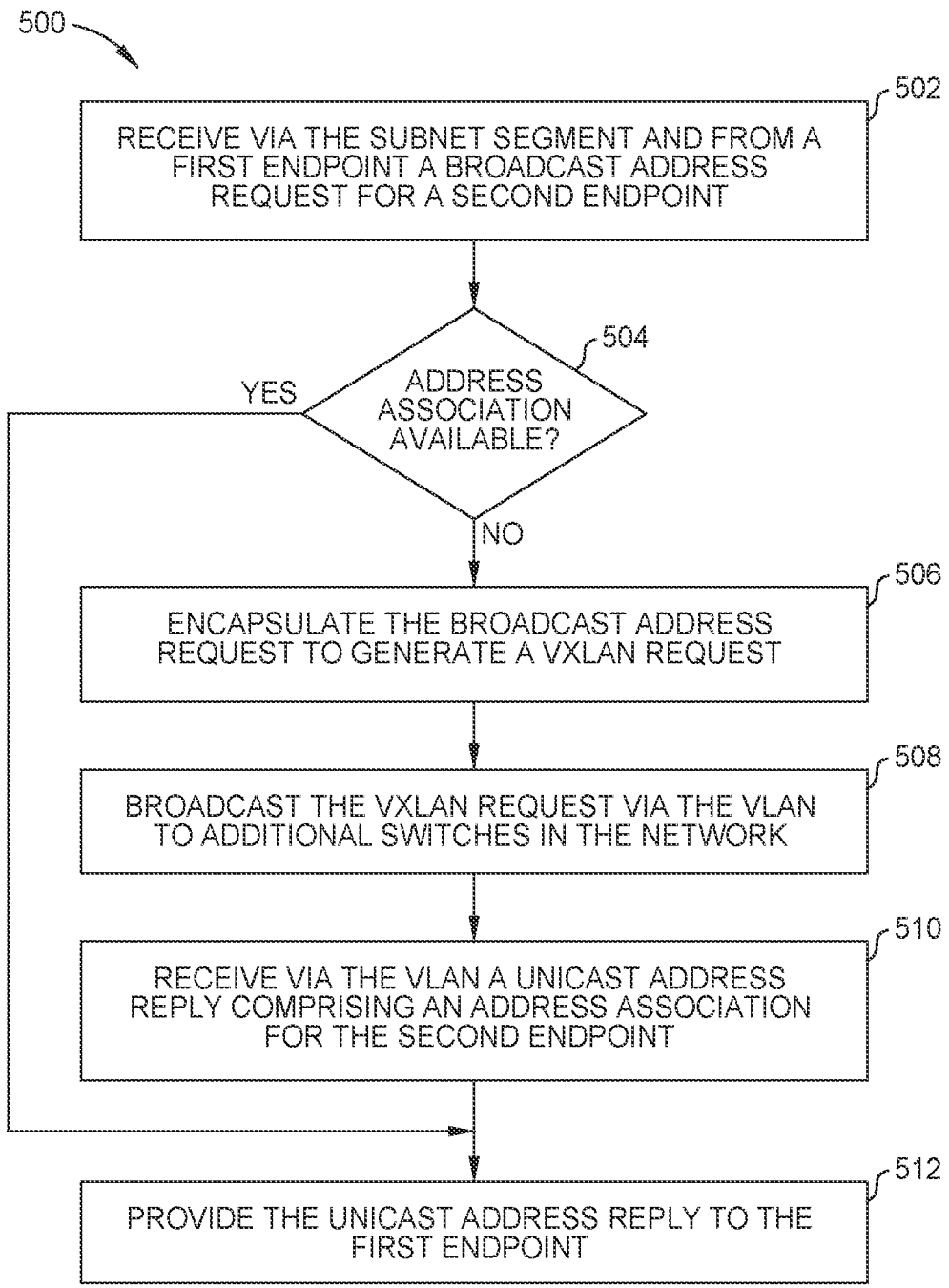
FIG. 5A is a method for address resolution in a segmented network, according to one embodiment.
Figure 5B:
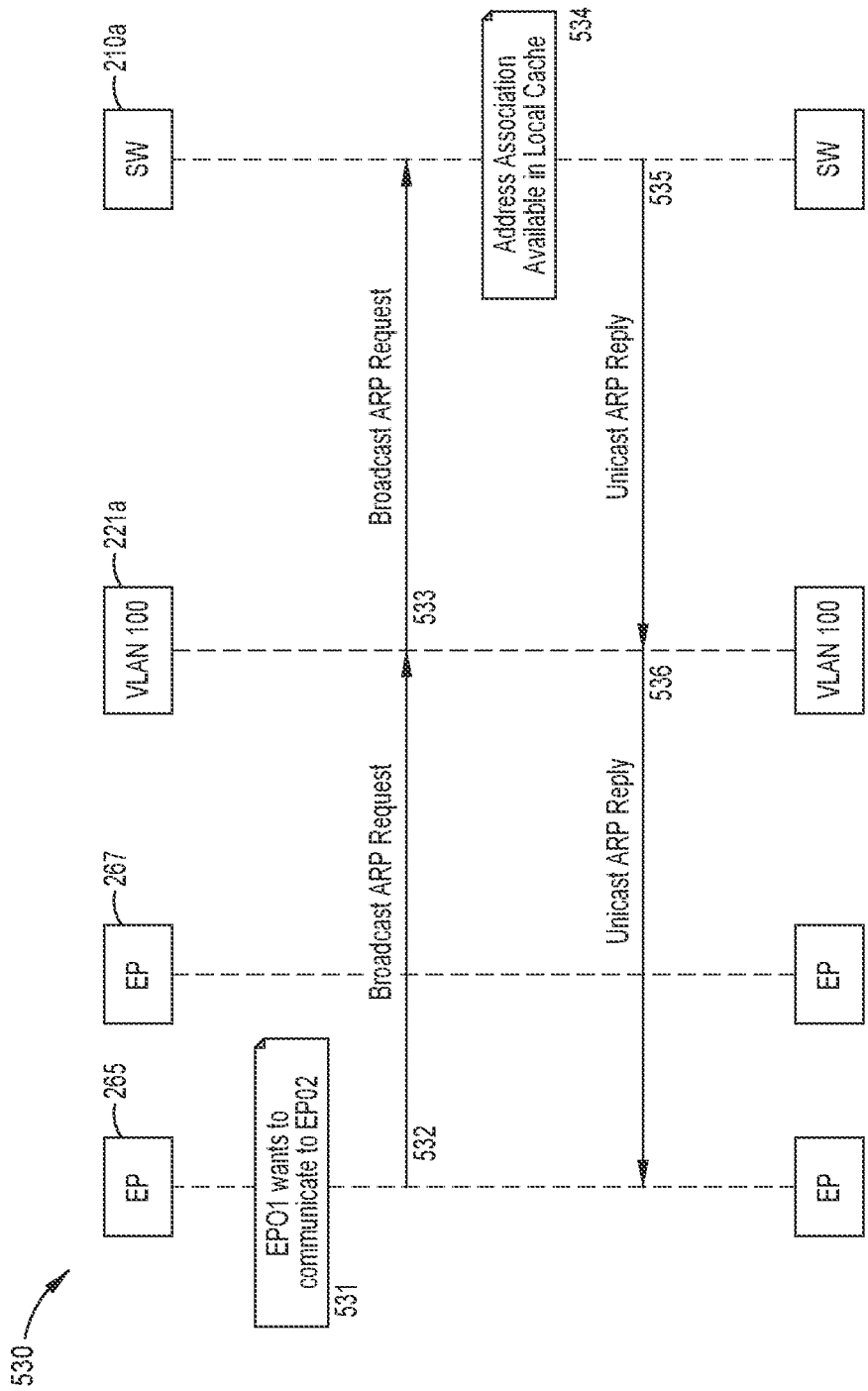

FIG. 5A is a method 500 for address resolution in a segmented network, according to one embodiment. FIGS. 5B-C are system flow diagrams for address resolution in a segmented network, including flow methods 530 and 550, according to embodiments. For ease of discussion, reference will be made to FIGS. 5A-C in relation to methods 500, 530, and 550. Method 500 begins at block 502, where the switch 210a receives via the logical subnet segment and from a first endpoint a broadcast address request for a second endpoint. For example, as shown in step 531 of method 530 and step 551 of step 550, the endpoint 265 would like to communicate data traffic to a second endpoint, such as the endpoint 266 or 267. At steps 532-533 and step 552, the switch 210a receives via the logical subnet segment 220 (e.g., the VLAN 10, VLAN instance 221a), a broadcast address request, such as an address resolution protocol (ARP) request which includes an identification of a second endpoint address (e.g., a MAC address for the second endpoint). While shown as a single step 552 in FIG. 5C, the broadcast address request is also received via the logical subnet segment 220/VLAN instance 221a in FIG. 5C.

At block 504, the switch 210a determines from the local cache whether an address association for the second endpoint is available in the local cache. For example, as shown in FIG. 2, the endpoint 267 is connected to the switch 210a via the AP 261 and in some examples is connected to a same logical subnet segment, logical subnet segment 220, such that the local cache for the logical subnet segment 220 includes an address association for the second endpoint (e.g., a MAC address for the endpoint 267 and a subnet identification for the endpoint 267). In another example, the endpoint 266 is connected to the switch 210b via the AP 264 and is connected to the same logical subnet segment, logical subnet segment 220 via the interface 220b.

In an example where the address association is available in the local cache, method 500 proceeds to block 512 and provides a unicast address reply to the first endpoint which includes the address association for the second endpoint from the local cache. For example, at step 534 in FIG. 5B, the switch 210a determines that the address association is available in the local cache and at steps 535 and 536 provides the determined address association for the endpoint 267 to the endpoint 265 via the VLAN 10 and the tunnel 252. While described above in relation to the endpoints 265 and 267 being in the same logical subnet segment, in some examples, the endpoints may be in different logical subnet segments. In this example, the switch 210a first determines if the logical subnet segment of the requesting endpoint is able to communicate with other logical subnet segments. For example, when the logical subnet segment 220 may communicate across logical subnet segments the switch 210a will leak the address association for the second endpoint from the local cache for the other logical subnet segment (e.g., address association for the endpoint 267 in the logical subnet segment 230). In an example where the logical subnet segments do not communicate across the logical segments, the layer-3 network handles the communication between the two endpoints.

In an example, where the address association is not available in the local cache such as at step 553, method 500 proceeds to block 506 where the switch 210a encapsulates the broadcast address request to generate a VXLAN request which includes an identification of an SGT and VNI for the first endpoint. For example, at step 554 the switch 210a encapsulates the ARP request received from the endpoint 265 and includes an identification of the logical subnet segment 220 including the VNI 10 and SGT 10 for the endpoint 265. At block 508, the switch 210a broadcasts the VXLAN request via the VLAN 130 to a plurality of switches in the network. For example at step 555 the switch 210 broadcasts the VXLAN packet via the VLAN 130 and the VXLAN flood and learn overlay 270 (including the broadcast tunnel 271a). In some examples, the switches in the domain 150 such as switch 210n do not have an address association for the second endpoint stored, but receive the broadcast address request via the overlay 270. For example, at step 556, the switch 210n receives the VXLAN request and at step 557 forwards the ARP request associated with the VXLAN request to local ports assigned to the logical subnet segment 220 on the switch 210n to account for the potential silent hosts/endpoints connected to the switch 210n (e.g., the endpoint 267 connected to the switch 210n, but the local cache does not include a host entry for the endpoint). When a silent host is not found, the switch 210n determines that the second endpoint is not in the local cache and not connected to the switch 210n and ignores the multicast packet received from the overlay 270 at step 559.

At step 558, the switch 210b receives the broadcast VXLAN request via the tunnel 271b. As shown in FIG. 2, the endpoint 266 is connected to the switch 210b via the AP 264. Upon connection to the switch 210b a host entry with an address association for the endpoint 266 is stored in the local cache. Thus, upon receiving the VXLAN request via the tunnel 271b, the switch 210b determines that the address association for the endpoint 266 is stored in the local cache at step 560. In some examples, the switch 210b determines and/or verifies that the endpoint 266 is connected to the logical subnet segment 220. In this example, the endpoint 266 is connected to the SVI 10 and VNI 10 via the interface 220b.

While described above in relation to the endpoints 265 and 266 being in the same logical subnet segment, in some examples, the endpoints may be in different logical subnet segments. As described above, in some examples, the logical subnet segments do not communicate across the segments to preserve secure segmentation to the logical subnet segments. In some examples, policies may allow for the subnet segments to communicate with other segments. When the logical subnet segment 220 may communicate across logical subnet segments the switch 210b will leak the address association for the second endpoint from the local cache for the other logical subnet segment (e.g., address association for the endpoint 267 in the logical subnet segment 230). In an example, where the endpoint 266 is not connected to the logical subnet segment 220, the switch 210b may determine that the address association for the endpoint 266 is in the local cache, but cannot be communicated to the switch 210a since the endpoint 266 is connected through a different logical subnet segment.

At step 561, the switch 210b sends a unicast address reply (e.g., an ARP response) which includes the address association for the second endpoint to the switch 210a over a unicast tunnel such as the tunnel 255. At block 510, the switch 210a receives via the VLAN a unicast address reply comprising an address association for the second endpoint. For example, the switch 210a receives the address association for the endpoint 266 via the unicast tunnel 255 in the VLAN 130. Once received, method 500 proceeds to block 512 and provides the unicast address reply received from the switch 210b to the endpoint 265 as described in above in relation to block 512 and steps 535-536 in FIG. 5B.

Figure 6A:
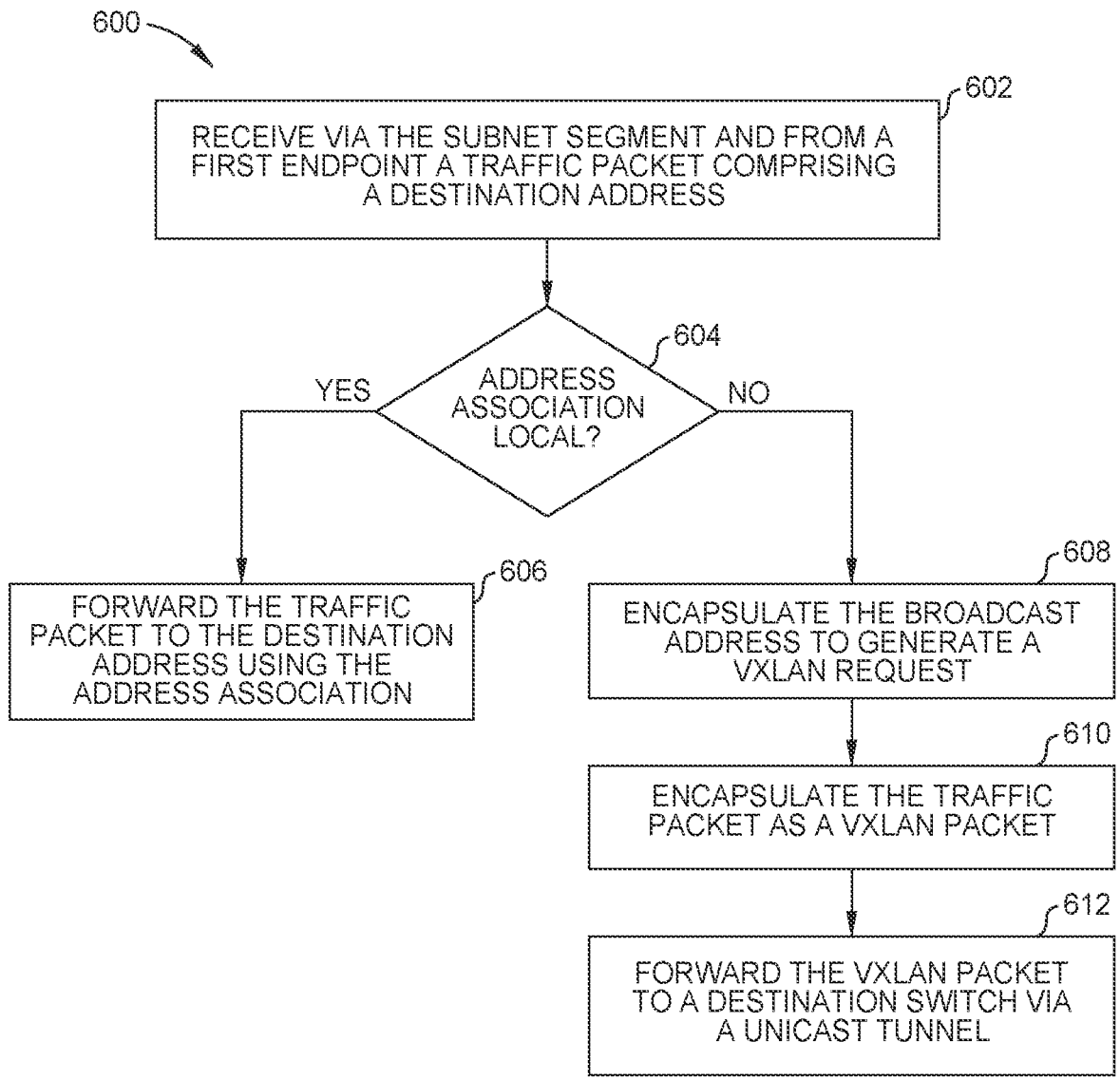
FIG. 6A is a method for communication in a segmented network, according to one embodiment.
Figure 6B:
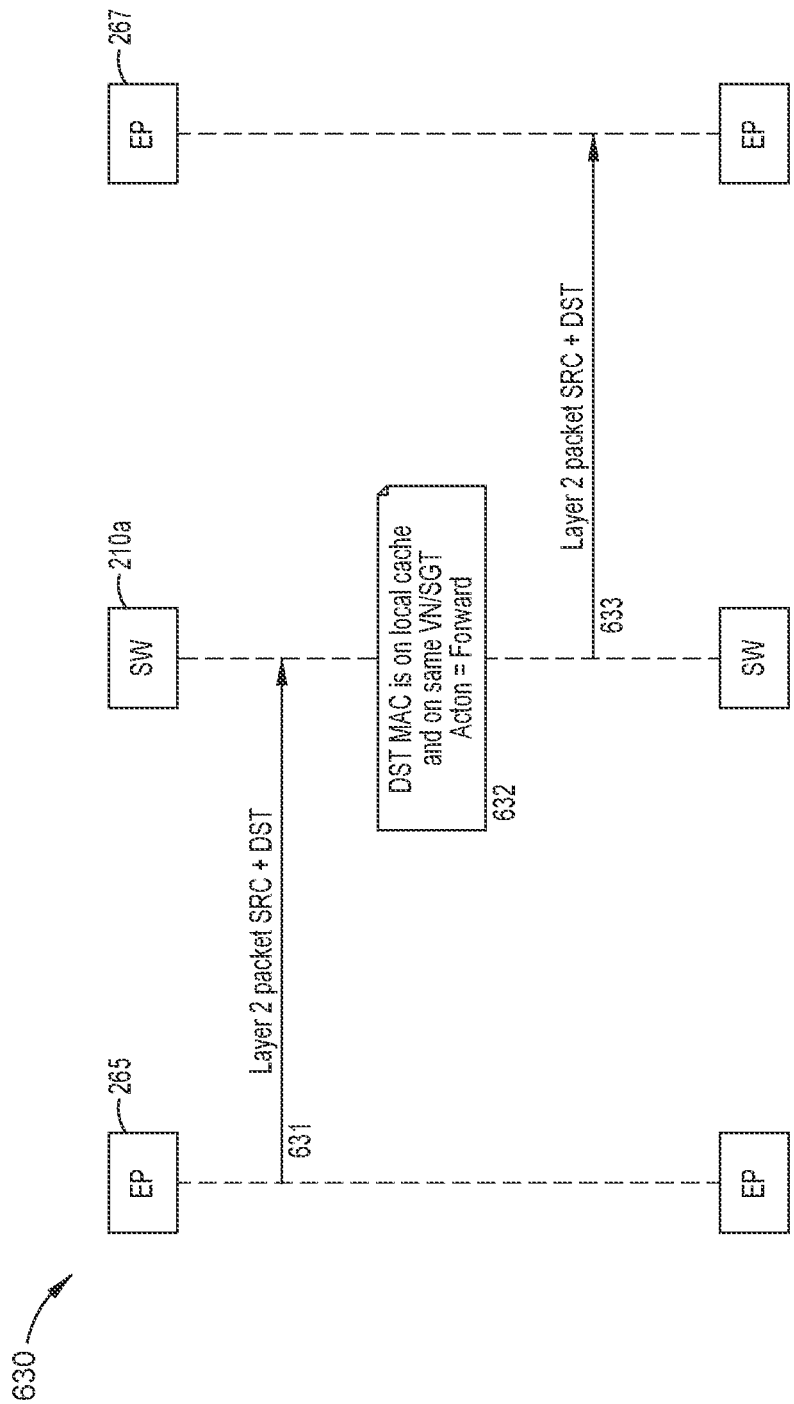

FIG. 6A is a method 600 for communication in a segmented network, according to one embodiment. FIGS. 6B-C are system flow diagrams for communication in a segmented network, including flow methods 630 and 650 according to embodiments. For ease of discussion, reference will be made to FIGS. 6A-C in relation to methods 600, 630, and 650. Method 600 begins at block 602 where the switch 210a receives via the logical subnet segment and from a first endpoint a traffic packet including a destination address. For example, at step 631 of method 630 and at step 652 of method 650, the endpoint 265 transmits a traffic packet to another/second endpoint. In some examples, the destination address (e.g., destination MAC) is already known/resolved as shown in step 651 which includes performing the methods described in relation to FIGS. 5A-C. The traffic packet may be a layer 2 packet which includes both the source (SRC) and the destination (DST) addresses.

At block 604, the switch 210a determines from the local cache whether an address association for the destination address is available in the local cache and associated with the logical subnet segment. For example, as shown in FIG. 6B, at step 632, the switch 210 determines that the destination address (DST MAC) for the endpoint 267 is stored in the local cache and that the endpoint 267 is associated with the logical subnet segment 220 (e.g., the same VNI 10/SGT 10). Upon determining the address association is available, the switch 210a forwards the traffic packet to the destination address using the address association at block 606. For example, the switch 210a forwards the traffic packet to the endpoint 267 via the tunnel 251 at step 633.

In another example, such as when the destination endpoint is endpoint 267, the switch 210 determines from a local cache that an address association for the destination address is available in the local cache and indicates the destination address is associated with a second switch. For example, at step 652 in FIG. 6C, switch 210a receives a traffic packet including a destination address and determines from the local cache and address association for the destination that the destination address is associated with the switch 210b at step 653. At step 654 the switch 210a may also perform an access policy check to verify that the endpoints 265 and 266 are in the same logical subnet segment (e.g., logical subnet segment 220) or that the logical subnet segment of the endpoint 265 is allowed to communicate across logical subnet segments if the endpoints 265 and 266 are in different logical subnet segments.

At block 608, the switch 210a encapsulates the traffic packet as a VXLAN packet and forwards the VXLAN packet to a destination switch via a unicast tunnel at block 612. For example, at step 655, the switch 210a encapsulates the packet and includes the RLOC for the switch 210a, the RLOC for the switch 210b as well as the logical subnet segment information for the endpoint 265 and 266. At step 670, the switch 210a send the VXLAN packet to the switch 210b.

At step 670, the switch 210b receives via the unicast tunnel 255 the VXLAN packet comprising a traffic packet from the switch 210a. The switch 210b determines from the VXLAN packet and a local cache, a destination address associated with an endpoint. For example at step 671 the switch 210b determines that the endpoint 266 is connected to the switch 210b and a part of the logical subnet segment 220. At step 672, the switch 210b verifies logical subnet segment traffic for the VXLAN packet. For example, the switch 210b verifies that the logical subnet segment policies allow for the traffic to be communicated to the endpoint 266 (including verifying inter-segment verification if in a different logical subnet segment from the endpoint 265). At step 673, the switch 210b de-encapsulates the packet and provides the traffic packet to the endpoint at step 674.

Figure 7:
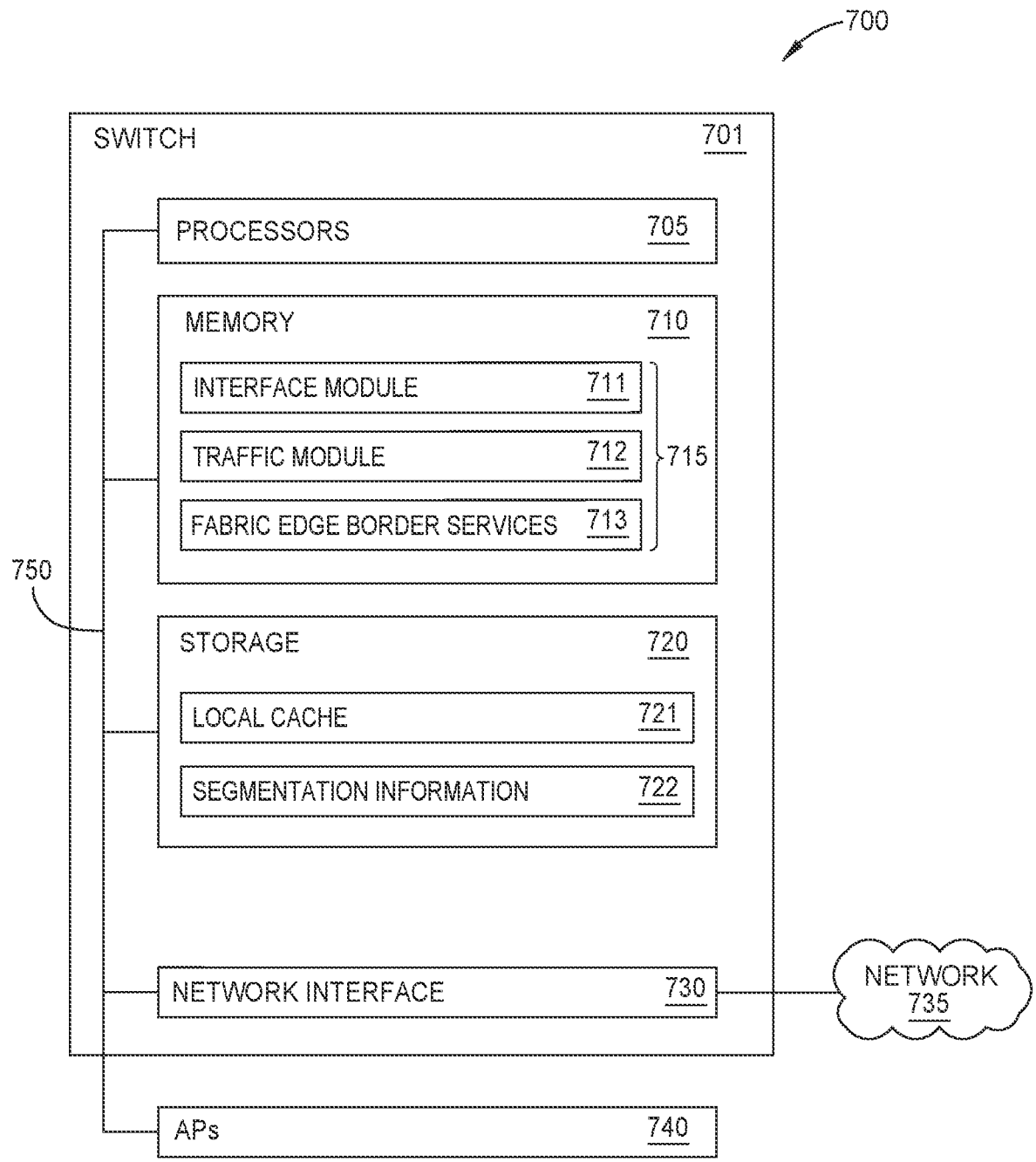
FIG. 7 is a block diagram of a switch, according to one embodiment described herein.

FIG. 7 is a block diagram of a switch, according to one embodiment described herein. As shown in FIG. 7, the arrangement 700 may include switch 701 configured to execute the various functions of the interfaces described herein in relation to switches 210a-n. The switch 701 is shown in the form of a general-purpose computing device, but may include a server and/or application executing on a cloud network. The components of switch 701 may include, but are not limited to, one or more processors (or processing units) 705, a system memory 710, a storage system 720, network interface 730 connecting the switch 701 to network 735, and a bus 750 that couples various system components including the system memory 710 and storage system 720 to processors 705 along with various input/output components (not shown). And the APs 740 (e.g., any of the APs described herein). In other embodiments, arrangement 700 is distributed and includes a plurality of discrete computing devices that are connected through wired or wireless networking.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Switch 701 typically includes a variety of computer system readable media. Such media may be any available media that is accessible by switch 701, and it includes both volatile and non-volatile media, removable and non-removable media.

System memory 710 can include computer system readable media in the form of volatile memory, such as random access memory (RAM) and/or cache memory. Switch 701 may further include other removable/non-removable, volatile/non-volatile computer system storage media. By way of example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 750 by one or more data media interfaces. As will be further depicted and described below, memory 610 may include at least one program product having a set (e.g., at least one) of program modules that are configured to carry out the functions of various embodiments described herein.

Switch 701 may further include other removable/non-removable, volatile/non-volatile computer system storage media. In some examples storage system 720 may be included as part of memory 710 and may typically provide a non-volatile memory for the networked computing devices, and may include one or more different storage elements such as Flash memory, a hard disk drive, a solid state drive, an optical storage device, and/or a magnetic storage device. For example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. Storage 720 may include media local cache 721 and segmentation information 722 stored for access and use by the switch 701.

Memory 710 may include a plurality of modules 715 for performing various functions described herein. The modules 715 generally include program code that is executable by one or more of the processors 705. As shown, modules 715 include interface module 711, traffic module 712 and fabric edge and border services module 713. The modules 715 may also interact with each other and storage system 720 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   initiating a default external interface for an external network comprising a single default switched virtual interface (SVI) for communication with the external network and corresponding to a virtual local area network (VLAN) provided by the external network;
   establishing a logical subnet segment interface from a main subnet segment, where a logical subnet segment and one or more additional logical subnet segments are represented to the external network as a single subnet segment and wherein the logical subnet segment interface does not have an assigned Internet Protocol (IP) address; and
   assigning an identifier to the logical subnet segment interface for the logical subnet segment; and
   mapping at least one tag to the identifier for the logical subnet segment.

2. The method of claim 1, further comprising:
   receiving a DHCP discover request from an endpoint;
   creating a host entry in a local cache for the endpoint;
   mapping the host entry to a tag of the at least one tag and the identifier;
   forwarding the DHCP discover request to a wide area network (WAN) router via the VLAN;
   receiving a DHCP offer for the endpoint from the WAN router via the VLAN, wherein the DHCP offer comprises an IP address;
   determining from the DHCP offer and the host entry, the mapped tag and segment VNI for the endpoint;
   providing the DHCP offer to the endpoint;
   receiving a DHCP request from the endpoint in response to the DHCP offer;
   forwarding the DHCP offer to the WAN router via the VLAN;
   receiving a DHCP acknowledgement (ACK) from the WAN router comprising the IP address;
   determining from the DHCP ACK and the host entry the mapped tag and identifier for the endpoint; and
   providing the DHCP ACK to the endpoint via the tag and the identifier.

3. The method of claim 1, further comprising:
   receiving via the logical subnet segment and from a first endpoint a broadcast address request for a second endpoint;
   determining from a local cache that an address association for the second endpoint is available in the local cache; and
   providing a unicast address reply comprising the address association for the second endpoint to the first endpoint.

4. The method of claim 1, further comprising:
   receiving via the logical subnet segment and from a first endpoint an broadcast address request for a second endpoint;
   determining from a local cache that an address association for the second endpoint is not available in the local cache;
   encapsulating the broadcast address request to generate a VXLAN request, wherein the VXLAN request comprises an identification of an tag and VNI for the first endpoint;
   broadcasting the VXLAN request via the VLAN to one or more additional switches in the network;
   receiving via the VLAN a unicast address reply comprising an address association for the second endpoint; and
   providing the unicast address reply to the first endpoint.

5. The method of claim 1, further comprising:
   receiving via the logical subnet segment and from a first endpoint a traffic packet comprising a destination address;
   determining from a local cache that an address association for the destination address is available in the local cache and associated with the logical subnet segment; and
   forwarding the traffic packet to the destination address using the address association.

6. The method of claim 1, further comprising:
   receiving via the logical subnet segment and from a first endpoint a traffic packet comprising a destination address;
   determining from a local cache that an address association for the destination address is available in the local cache and associated with the logical subnet segment, wherein the address association indicates the destination address is associated with a second switch;
   encapsulating the traffic packet as a VXLAN packet; and
   forwarding the VXLAN packet to a destination switch via a unicast tunnel.

7. The method of claim 1, further comprising:
   receiving, via a unicast tunnel, a VXLAN packet comprising a traffic packet;

determining from the VXLAN packet and a local cache, a destination address associated with an endpoint;
verifying logical subnet segment traffic for the VXLAN packet; and
providing the traffic packet to the endpoint.

8. A system comprising:
a processor; and
a memory comprising instructions which, when executed on the processor, performs an operation, the operation comprising:
initiating a default external interface for an external network comprising a single default switched virtual interface (SVI) for communication with the external network and corresponding to a virtual local area network (VLAN) provided by the external network;
establishing a logical subnet segment interface from a main subnet segment, where a logical subnet segment and one or more additional logical subnet segments are represented to the external network as a single subnet segment and wherein the logical subnet segment interface does not have an assigned Internet Protocol (IP) address; and
assigning an identifier to the logical subnet segment interface for the logical subnet segment; and
mapping at least one tag to the identifier for the logical subnet segment.

9. The system of claim 8, wherein the operation further comprises:
receiving a DHCP discover request from an endpoint;
creating a host entry in a local cache for the endpoint;
mapping the host entry to a tag of the at least one tag and the identifier;
forwarding the DHCP discover request to a wide area network (WAN) router via the VLAN;
receiving a DHCP offer for the endpoint from the WAN router via the VLAN, wherein the DHCP offer comprises an IP address;
determining from the DHCP offer and the host entry the mapped tag and identifier for the endpoint;
providing the DHCP offer to the endpoint;
receiving a DHCP request from the endpoint in response to the DHCP offer;
forwarding the DHCP offer to the WAN router via the VLAN;
receiving a DHCP acknowledgement (ACK) from the WAN router comprising the IP address;
determining from the DHCP ACK and the host entry the mapped tag and identifier for the endpoint; and
providing the DHCP ACK to the endpoint via the mapped tag and the identifier.

10. The system of claim 8, wherein the operation further comprises:
receiving via the logical subnet segment and from a first endpoint a broadcast address request for a second endpoint;
determining from a local cache that an address association for the second endpoint is available in the local cache; and
providing a unicast address reply comprising the address association for the second endpoint to the first endpoint.

11. The system of claim 8, wherein the operation further comprises:
receiving via the logical subnet segment and from a first endpoint an broadcast address request for a second endpoint;
determining from a local cache that an address association for the second endpoint is not available in the local cache;
encapsulating the broadcast address request to generate a VXLAN request, wherein the VXLAN request comprises an identification of an tag and VNI for the first endpoint;
broadcasting the VXLAN request via the VLAN to one or more additional switches in the network;
receiving via the VLAN a unicast address reply comprising an address association for the second endpoint; and
providing the unicast address reply to the first endpoint.

12. The system of claim 8, wherein the operation further comprises:
receiving via the logical subnet segment and from a first endpoint a traffic packet comprising a destination address;
determining from a local cache that an address association for the destination address is available in the local cache and associated with the logical subnet segment; and
forwarding the traffic packet to the destination address using the address association.

13. The system of claim 8, wherein the operation further comprises:
receiving via the logical subnet segment and from a first endpoint a traffic packet comprising a destination address;
determining from a local cache that an address association for the destination address is available in the local cache and associated with the logical subnet segment, wherein the address association indicates the destination address is associated with a second switch;
encapsulating the traffic packet as a VXLAN packet; and
forwarding the VXLAN packet to a destination switch via a unicast tunnel.

14. The system of claim 8, wherein the operation further comprises:
receiving, via a unicast tunnel, a VXLAN packet comprising a traffic packet;
determining from the VXLAN packet and a local cache, a destination address associated with an endpoint;
verifying logical subnet segment traffic for the VXLAN packet; and
providing the traffic packet to the endpoint.

15. A computer program product, the computer program product comprising:
a computer-readable storage medium having computer-readable program code embodied therewith, the computer-readable program code executable by one or more computer processors to perform an operation, the operation comprising:
initiating a default external interface for an external network comprising a single default switched virtual interface (SVI) for communication with the external network and corresponding to a virtual local area network (VLAN) provided by the external network;
establishing a logical subnet segment interface from a main subnet segment, where a logical subnet segment and one or more additional logical subnet segments are represented to the external network as a single subnet segment and wherein the logical subnet segment interface does not have an assigned Internet Protocol (IP) address; and
assigning an identifier to the logical subnet segment interface for the logical subnet segment; and mapping at least one tag to the identifier for the logical subnet segment.

16. The computer program product of claim 15, wherein the operation further comprises:
receiving a DHCP discover request from an endpoint;
creating a host entry in a local cache for the endpoint;
mapping the host entry to a tag of the at least one tag and the identifier;
forwarding the DHCP discover request to a wide area network (WAN) router via the VLAN;
receiving a DHCP offer for the endpoint from the WAN router via the VLAN, wherein the DHCP offer comprises an IP address;
determining, from the DHCP offer and the host entry, the mapped tag and identifier for the endpoint;
providing the DHCP offer to the endpoint;
receiving a DHCP request from the endpoint in response to the DHCP offer;
forwarding the DHCP offer to the WAN router via the VLAN;
receiving a DHCP acknowledgement (ACK) from the WAN router comprising the IP address;
determining, from the DHCP ACK and the host entry, the mapped tag and identifier for the endpoint; and
providing the DHCP ACK to the endpoint via the mapped tag and the identifier.

17. The computer program product of claim 15, wherein the operation further comprises:
receiving via the logical subnet segment and from a first endpoint a broadcast address request for a second endpoint;
determining from a local cache that an address association for the second endpoint is available in the local cache; and
providing a unicast address reply comprising the address association for the second endpoint to the first endpoint.

18. The computer program product of claim 15, wherein the operation further comprises:
receiving via the logical subnet segment and from a first endpoint an broadcast address request for a second endpoint;
determining from a local cache that an address association for the second endpoint is not available in the local cache;
encapsulating the broadcast address request to generate a VXLAN request, wherein the VXLAN request comprises an identification of an tag and VNI for the first endpoint;
broadcasting the VXLAN request via the VLAN to one or more additional switches in the network;
receiving via the VLAN a unicast address reply comprising an address association for the second endpoint; and
providing the unicast address reply to the first endpoint.

19. The computer program product of claim 15, wherein the operation further comprises:
receiving via the logical subnet segment and from a first endpoint a traffic packet comprising a destination address;
determining from a local cache that an address association for the destination address is available in the local cache and associated with the logical subnet segment; and
forwarding the traffic packet to the destination address using the address association.

20. The computer program product of claim 15, wherein the operation further comprises:
receiving via the logical subnet segment and from a first endpoint a traffic packet comprising a destination address;
determining from a local cache that an address association for the destination address is available in the local cache and associated with the logical subnet segment, wherein the address association indicates the destination address is associated with a second switch;
encapsulating the traffic packet as a VXLAN packet; and
forwarding the VXLAN packet to a destination switch via a unicast tunnel.

* * * * *